(12) United States Patent
Shin

(10) Patent No.: US 11,939,009 B2
(45) Date of Patent: Mar. 26, 2024

(54) STEERING CONTROL APPARATUS AND METHOD

(71) Applicant: HL MANDO CORPORATION, Gyeonggi-do (KR)

(72) Inventor: Junho Shin, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 321 days.

(21) Appl. No.: 17/465,854

(22) Filed: Sep. 3, 2021

(65) Prior Publication Data

US 2022/0073130 A1 Mar. 10, 2022

(30) Foreign Application Priority Data

Sep. 8, 2020 (KR) .................. 10-2020-0114469

(51) Int. Cl.
*B62D 5/04* (2006.01)

(52) U.S. Cl.
CPC ......... *B62D 5/0463* (2013.01); *B62D 5/0421* (2013.01); *B62D 5/0481* (2013.01); *B62D 5/0469* (2013.01)

(58) Field of Classification Search
CPC .. B62D 5/0463; B62D 5/0421; B62D 5/0481; B62D 5/0469; B62D 5/046; B62D 5/0496; B62D 5/0484; B62D 6/00
See application file for complete search history.

(56) References Cited

U.S. PATENT DOCUMENTS

| 2015/0084570 | A1* | 3/2015 | Hara | B62D 5/0484 |
| | | | | 318/494 |
| 2019/0241207 | A1* | 8/2019 | Jeong | B62D 15/021 |
| 2020/0189607 | A1* | 6/2020 | Wesenberg | B62D 5/003 |
| 2022/0048538 | A1* | 2/2022 | Zaydel | B60W 60/0025 |

FOREIGN PATENT DOCUMENTS

| DE | 10 2018 102 105 | 8/2018 |
| DE | 10 2019 212 574 | 2/2020 |
| KR | 10-2020-0059476 | 5/2020 |

OTHER PUBLICATIONS

Office Action for German Patent Application No. 10 2021 209 925.4 dated Jan. 30, 2023 and its English translation provided by Google Translate.

* cited by examiner

*Primary Examiner* — George C Jin
(74) *Attorney, Agent, or Firm* — Ladas & Parry, LLP

(57) ABSTRACT

The present disclosure relates to a steering control apparatus and method. The steering control apparatus includes a first steering control module and a second steering control module. The first and second steering control modules respectively include first and second temperature sensors detecting respective internal temperatures of the first and second steering control modules. The first steering control module can transmit information on a first temperature detected by the first temperature sensor to the second steering control module, and the second steering control module can receive the information on the first temperature and transmit information on a second temperature detected by the second temperature sensor. The first and second steering control modules can transition according to the information on the first and second temperatures, and the first steering control module or the second steering control module can control a steering motor.

8 Claims, 9 Drawing Sheets

STEERING CONTROL APPARATUS AND METHOD

CROSS-REFERENCE TO RELATED APPLICATION

This application claims the priority benefit of Korean Patent Application No. 10-2020-0114469, filed on Sep. 8, 2020 in the Korean Intellectual Property Office, the disclosure of which is incorporated herein by reference in its entirety.

BACKGROUND

Field of the Disclosure

The present disclosure relates to steering control apparatuses and methods, and more specifically, to a steering control apparatus including a first steering control module and a second steering control module, and a method of controlling steering using the steering control apparatus.

Description of the Background

Power-assisted steering apparatuses are generally used in vehicles as an apparatus for reducing the steering force of a steering wheel (handle) and in turn improving steering stability. As one such power-assisted steering apparatus, a hydraulic power steering system (HPS) using hydraulic pressure has been widely used. Recently, an electric power steering system (EPS) has been increasingly used in vehicles, which assists a driver's steering force using the rotary force of an electric motor unlike the conventional system using hydraulic pressure, and is an environmentally-friendly system.

Interest in the electric power steering system has been increasing toward an electronic power steering system to which a redundant system for controlling the steering of a vehicle by using two or more ECUs is applied from typical systems using one electronic control unit (ECU) for controlling a vehicle. Steering stability can be enhanced through the redundant system in such a manner that when one ECU cannot perform its function due to physical damage, error, or the like, then, instead of the ECU, another ECU is allowed to perform that function.

In such a redundant system, while one ECU is used, another ECU that serves as a spare ECU is kept on standby, so research on how to utilize the ECU kept on standby has been in progress.

SUMMARY

To address this issue, embodiments of the present disclosure provide a steering control apparatus and method for allowing a first steering apparatus (or module) and a second steering apparatus (or module) to transition according to their internal temperatures and to perform respective divided roles.

According to aspects of the present disclosure, a steering control apparatus is provided that includes a first steering control module and a second steering control module. The first and second steering control modules respectively include first and second temperature sensors detecting respective internal temperatures of the first and second steering control modules. The first steering control module can transmit information on a first temperature detected by the first temperature sensor to the second steering control module, and the second steering control module can receive the information on the first temperature and transmit information on a second temperature detected by the second temperature sensor. The first and second steering control modules can transition according to the information on the first and second temperatures, and the first steering control module or the second steering control module can control a steering motor.

According to aspects of the present disclosure, a steering control method is provided that include detecting respective internal temperatures of a first steering control module and a second steering control module, allowing the first steering control module to transmit information on a first temperature that is an internal temperature of the first steering control module to the second steering control module and receive information on a second temperature that is an internal temperature of the second steering control module from the second steering control module, and the second steering control module to transmit the information on the second temperature to the first steering control module and receive the information on the first temperature from the first steering control module, and allowing the first and second steering control modules to transition according to the information on the first and second temperatures and the first or second steering control module to control a steering motor.

According to embodiments of the present disclosure, it is possible to enhance the stability of a power pack and transcend limitations on the control of a steering motor by allowing a first steering control module and a second steering control module to transition according to their internal temperatures and to alternately control the steering motor.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure. In the drawings.

DETAILED DESCRIPTION

Figure 1:
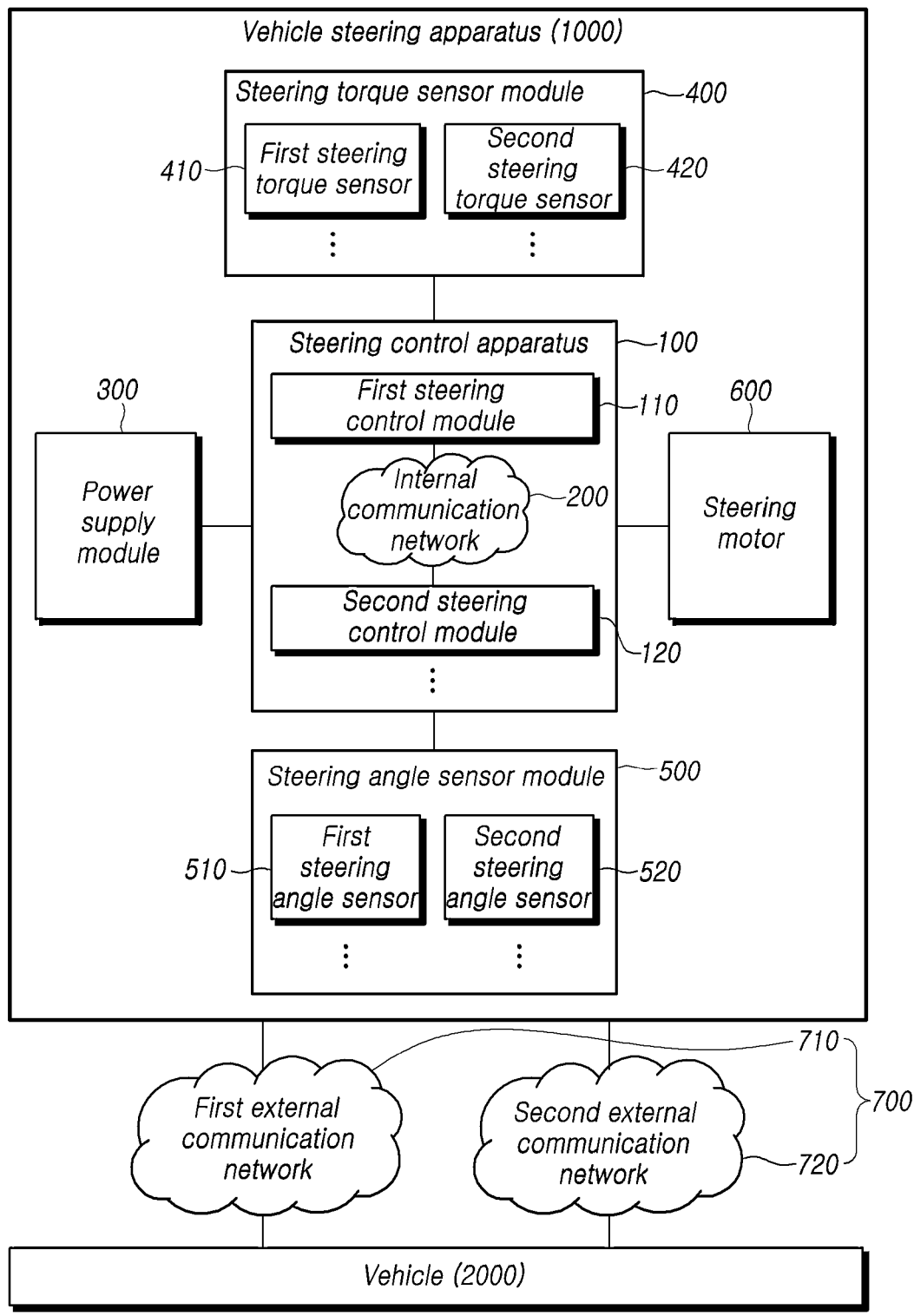
FIG. 1 illustrates an overall configuration of a steering apparatus of a vehicle according to aspects of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other. When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, a steering control apparatus 100 employed in a vehicle according to aspects of the present disclosure will be described with reference to the accompanying drawings.

Hereinafter, a steering apparatus employed in the vehicle according to aspects of the present disclosure will be described with reference to the accompanying drawings.

FIG. 1 illustrates an overall configuration of the steering apparatus of the vehicle according to aspects of the present disclosure.

Referring to FIG. 1, the steering apparatus 1000 of the vehicle according to aspects of the present disclosure may include the steering control apparatus 100, an internal communication network 200 and the like.

The steering control apparatus 100 can be connected to a steering motor 600. The steering control apparatus 100 can control the steering motor 600. In one embodiment, a plurality of steering control apparatus 100 such as steering control modules (110, 120 etc.) may be included in the steering apparatus 1000 of the vehicle.

Each of the steering control modules (110, 120 etc.) can control the steering motor 600. For example, each of the steering control modules (110, 120 etc.) can control one steering motor 600. That is, each of the steering control modules (110, 120 etc.) may have the same control function. In addition, the steering control modules (110, 120 etc.) having the same control function can control one steering motor 600 at different times.

Each of the steering control modules (110, 120 etc.) may be connected to each other via the internal communication network 200. Here, the internal communication network 200 may be a network used only for connecting the steering control modules (110, 120 etc.) to each other, that is, a dedicated communication network (a private control area network ("CAN") or an internal CAN) only for the steering control modules.

For example, the internal communication network 200 may include at least one of a wired communication network and a wireless communication network. In particular, the internal communication network 200 may include a CAN, but embodiments of the present disclosure are not limited thereto. For example, any types of communication networks may be used for the internal communication network 200 as long as they can connect between steering control modules.

In a situation where an operating status of one of the steering control modules (110, 120 etc.) that is currently controlling the steering motor 600 is abnormal, each of the steering control modules (110, 120 etc.) can monitor operating statuses of one or more other steering control modules using the internal communication network 200 so that the steering motor 600 can be controlled through at least one of the remaining steering control modules.

More specifically, each of the steering control modules (110, 120 etc.) can monitor operating statuses of one or more other steering control modules via the internal communication network 200. Thereby, each of the steering control modules (110, 120 etc.) can determine an initiative for controlling the steering motor 600 based on a result of the monitoring.

In one embodiment, when it is determined that an operating status of a steering control module currently controlling the steering motor 600 among the steering control modules (110, 120 etc.) is abnormal based on the result of the monitoring, each of the steering control modules (110, 120 etc.) can operate so that the initiative for controlling the steering motor 600 can be transitioned from the steering control module currently controlling the steering motor 600 into at least one of the remaining steering control modules that are normally operating.

That is, when it is determined that an operating status of a steering control module currently controlling the steering motor 600 among the steering control modules (110, 120 etc.) is abnormal based on the result of the monitoring, each of the steering control modules (110, 120 etc.) can operate so that the steering motor 600 can be controlled by at least one of the remaining steering control modules.

In another embodiment, when it is determined that an operating status of a steering control module currently controlling the steering motor 600 among the steering control modules (110, 120 etc.) is normal based on the result of the monitoring, each of the steering control modules (110, 120 etc.) can operate so that the initiative for controlling the steering motor 600 can be continuously retained by the steering control module currently controlling the steering motor 600.

That is, when it is determined that an operating status of a steering control module currently controlling the steering motor 600 among the steering control modules (110, 120 etc.) is normal based on the result of the monitoring, each of the steering control modules (110, 120 etc.) can operate so that the steering motor 600 can be continuously controlled by the steering control module currently controlling the steering motor 600.

As described above, in the steering apparatus for the vehicle according to aspects of the present disclosure, in a situation where two or more steering control modules are connected together via an internal communication network, when it is determined that an operating status of a steering control module currently controlling the steering motor 600 is abnormal, as each of the steering control modules is allowed to monitor the operating statuses of one or more other steering control modules using the internal communication network so that the steering motor 600 can be controlled by at least one of the remaining steering control modules, since an initiative for controlling the steering motor 600 can be transitioned to another steering control module serving a backup function even when the steering control module currently controlling the steering motor 600 operates abnormally, therefore, it is possible to assist the steering of the vehicle while no steering performance of the vehicle is reduced, and thereby, enhance the redundancy and reliability of the vehicle.

As described above, although the steering control apparatus 100 can operate using two steering control apparatus (modules), however, embodiments of the present disclosure are not limited thereto. For example, the steering control apparatus 100 may include three or more steering control apparatus (modules). In particular, one of the steering control modules can serve as a primary steering control module, and one or more remaining steering control modules can serve as sub steering control module(s) or redundant steering control module(s).

Hereinafter, for simplicity of description, discussions will be conducted on a situation in which two steering control apparatuses (modules) are used as the steering control apparatuses 100 employed in the steering apparatus 1000 of the vehicle according to aspects of the present disclosure.

Referring back to FIG. 1, a first steering control module 110 and a second steering control module 120 can be included in the steering apparatus 1000. The first steering control module 110 may serve as a primary steering control module capable of driving the steering motor 600 with the highest priority. In addition, the second steering control module 120 may serve as a sub steering control module or a redundant steering control module capable of driving the steering motor 600 instead of the first steering control module 110 if needed.

When an operating status of the first steering control module 110 currently controlling the steering motor 600 is abnormal, the second steering control module 120 can monitor the operating status of the first steering control module 110 via the internal communication network 200 so that the steering motor can be controlled by the second steering control module 120 instead of the first steering control module 110.

Specifically, the second steering control module 120 can monitor the operating status of the first steering control module 110 currently controlling the steering motor 600 via the internal communication network 200. Further, the steering control module 120 can determine an initiative for controlling the steering motor 600 based on a result of the monitoring.

In one embodiment, when it is determined that an operating status of the first steering control module 110 currently controlling the steering motor 600 is abnormal based on the result of the monitoring, the second steering control module 120 can change the initiative for controlling the steering motor 600 from the first steering module 110 to the second steering control module 120.

That is, when it is determined that the operating status of the first steering control module 110 currently controlling the steering motor 600 is abnormal based on the result of the monitoring, the second steering control module 120 can control the steering motor 600 instead of the first steering module 110.

In another embodiment, when it is determined that the operating status of the first steering control module 110 currently controlling the steering motor 600 is normal based on the result of the monitoring, the second steering control module 120 can operate such that the initiative for controlling the steering motor 600 can be continuously retained by the first steering module 110.

That is, when it is determined that the operating status of the first steering control module 110 currently controlling the steering motor 600 is normal based on the result of the monitoring, the steering motor 600 can be allowed to be continuously controlled by the first steering module 110.

Meanwhile, when the respective operating statuses of the first and second steering control modules 110 and 120 become abnormal, operation of a steering wheel of the vehicle can transition to a manual mode or a reduced assist mode.

In one embodiment, when the respective operating statuses of the first and second steering control modules 110 and 120 become abnormal, the second steering control module 120 can change the operation of the steering wheel to the manual mode or the reduced assist mode.

In another embodiment, when the respective operating statuses of the first and second steering control modules 110 and 120 become abnormal, the vehicle can change the operation of the steering wheel to the manual mode or the reduced assist mode.

Meanwhile, the first steering control module 110 and the second steering control module 120 may be duplicated to be equal to each other. That is, the first steering control module 110 and the second steering control module 120 may include the same elements.

As described above, in the steering apparatus of the vehicle according to aspects of the present disclosure, as steering torque sensors, steering angle sensors, and motor position sensors, as well as the first and second steering control modules, are duplicated to equal to each other, each element for steering control except for the steering motor can be configured such that two elements performing a substantial equal function are duplicated to form one package rather than being operated independently as separate elements, and thereby, it is possible to enhance the redundancy and reliability of the vehicle.

Referring to FIG. 1, the steering apparatus 1000 of the vehicle according to aspects of the present disclosure may include a power supply module 300.

The power supply module 300 may be connected to the steering control apparatus 100. The power supply module 300 may supply electric energy to the steering control apparatus 100. The power supply module 300 may supply a DC voltage to the steering control apparatus 100. The power supply module 300 may supply two DC voltages to the steering control apparatus 100.

The two DC voltages may be a first DC voltage and a second DC voltage. The first DC voltage may be supplied to the first steering control module 110 and may be referred to as a primary DC voltage. The second DC voltage may be supplied to the second steering control module 120 and may be referred to as a sub DC voltage or a redundant DC voltage.

The operation of the power supply module 300 can be controlled and monitored by each of the steering control modules 110 and 120. Each of the steering control modules 110 and 120 can monitor the operating status of the power supply module 300 and the status of the supplied DC voltage, and then determine an initiative for controlling the steering motor 600 according to a result of the monitoring.

For example, the second steering control module 120 can monitor an operating status of the first steering control module 110 via the internal communication network 200. Further, the second steering control module 120 can determine an initiative for controlling the steering motor 600 based on the result of the monitoring. The second steering control module 120 can monitor the operating status of the power supply module 300 and the status of the supplied DC voltage by monitoring the operating status of the first steering control module 110.

In one embodiment, when it is determined that the first DC voltage supplied from the power supply module 300 to the first steering control module 110 is abnormal based on the result of the monitoring, the second steering control module 120 can change the initiative for controlling the steering motor 600 from the first steering module 110 to the second steering control module 120.

That is, when it is determined that the first DC voltage supplied from the power supply module 300 to the first steering control module 110 is abnormal based on the result of the monitoring, the second steering control module 120 can control the steering motor 600 instead of the first steering control module 110 based on the second DC voltage received from the power supply module 300.

In another embodiment, when it is determined that the first DC voltage supplied from the power supply module 300 to the first steering control module 110 is normal based on the result of the monitoring, the second steering control module 120 can operate such that the first steering module 110 continuously retains the initiative for controlling the steering motor 600.

That is, when it is determined that the first DC voltage supplied from the power supply module 300 to the first steering control module 110 is normal based on the result of the monitoring, the steering motor 600 can be allowed to be continuously controlled by the first steering module 110.

Referring to FIG. 1, the steering apparatus 1000 of the vehicle according to aspects of the present disclosure may include a steering torque sensor module 400.

The steering torque sensor module 400 may include a plurality of torque sensors. For example, the steering torque sensor module 400 may include at least one first steering torque sensor 410 and at least one second steering torque sensor 420.

The at least one first steering torque sensor 410 and the at least one second steering torque sensor 420 can measure a torque of the steering wheel of the vehicle. The at least one first steering torque sensor 410 and the at least one second steering torque sensor 420 can generate torque information of the steering wheel based on the measured torque for the steering wheel.

The at least one first steering torque sensor 410 may be connected to the first steering control module 110. The at least one first steering torque sensor 410 can supply the torque information of the steering wheel to the first steering control module 110. The first steering torque sensor 410 may be referred to as a primary steering torque sensor as it can supply the torque information of the steering wheel to the first steering control module 110.

The at least one second steering torque sensor 420 may be connected to the second steering control module 120. The at least one second steering torque sensor 420 can supply torque information of the steering wheel to the second steering control module 120. The second steering torque sensor 420 may be referred to as a sub steering torque sensor or a redundant steering torque sensor as it can supply the torque information of the steering wheel to the second steering control module 120.

The operation of the steering torque sensor module 400 can be controlled and monitored by each of the steering control modules 110 and 120. Each of the steering control modules 110 and 120 can monitor an operating status of the steering torque sensor module 400 and torque information of the steering wheel that is supplied, and determine an initiative for controlling the steering motor 600 according to a result of the monitoring.

For example, the second steering control module 120 can monitor an operating status of the first steering control module 110 via the internal communication network 200. Further, the second steering control module 120 can determine the initiative for controlling the steering motor 600 based on the result of the monitoring. The second steering control module 120 can monitor an operating status of the at least one first steering torque sensor 410 and torque information of the steering wheel that is supplied by monitoring the operating status of the first steering control module 110.

In one embodiment, when it is determined that the torque information of the steering wheel supplied from the at least one first steering torque sensor 410 to the first steering control module 110 is abnormal based on the result of the monitoring, the second steering control module 120 can change the initiative for controlling the steering motor 600 from the first steering module 110 to the second steering control module 120.

That is, when it is determined that the torque information of the steering wheel supplied from the at least one first steering torque sensor 410 to the first steering control module 110 is abnormal based on the result of the monitoring, the second steering control module 120 can control the steering motor 600 instead of the first steering control module 110 based on torque information of the steering wheel received from the at least one second steering torque sensor 420.

In another embodiment, when it is determined that the torque information of the steering wheel supplied from the at least one first steering torque sensor 410 to the first steering control module 110 is normal based on the result of the monitoring, the second steering control module 120 can operate such that the first steering module 110 continuously retains the initiative for controlling the steering motor 600.

That is, when it is determined that the torque information of the steering wheel supplied from the at least one first steering torque sensor 410 to the first steering control module 110 is normal based on the result of the monitoring, the steering motor 600 can be allowed to be continuously controlled by the first steering module 110.

Meanwhile, the first steering control module 110 and the second steering control module 120 may include an electronic control unit (ECU), but embodiments of the present disclosure are not limited to. For example, any types of control apparatuses (or systems) may be included in the first steering control module 110 and the second steering control module 120 as long as they are electronically controllable apparatuses (or systems).

Referring to FIG. 1, the steering apparatus 1000 of the vehicle according to aspects of the present disclosure may include a steering angle sensor module 500.

The steering angle sensor module 500 may include a plurality of steering angle sensors. For example, the steering angle sensor module 500 may include at least one first steering angle sensor 510 and at least one second steering angle sensor 520.

The at least one first steering angle sensor 510 and the at least one second steering angle sensor 520 can measure a steering angle of the steering wheel of the vehicle. The at least one first steering angle sensor 510 and the at least one second steering angle sensor 520 can generate steering angle information of the steering wheel based on the measured steering angle for the steering wheel.

The at least one first steering angle sensor 510 may be connected to the first steering control module 110. The at least one first steering angle sensor 510 can supply the steering angle information of the steering wheel to the first steering control module 110. The first steering angle sensor 510 may be referred to as a primary steering angle sensor as it can supply the steering angle information of the steering wheel to the first steering control module 110.

The at least one second steering angle sensor 520 may be connected to the second steering control module 120. The at least one second steering angle sensor 520 can supply steering angle information of the steering wheel to the second steering control module 120. The second steering angle sensor 520 may be referred to as a sub steering angle sensor or a redundant steering angle sensor as it can supply the steering angle information of the steering wheel to the second steering control module 120.

The operation of the steering angle sensor module 500 can be controlled and monitored by each of the steering control modules 110 and 120. Each of the steering control modules 110 and 120 can monitor an operating status of the steering angle sensor module 500 and steering angle information of the steering wheel that is supplied, and determine an initiative for controlling the steering motor 600 according to a result of the monitoring.

For example, the second steering control module 120 can monitor an operating status of the first steering control module 110 via the internal communication network 200. Further, the second steering control module 120 can determine the initiative for controlling the steering motor 600 based on the result of the monitoring. The second steering control module 120 can monitor an operating status of the at least one first steering angle sensor 510 and steering angle information of the steering wheel that is supplied by monitoring the operating status of the first steering control module 110.

In one embodiment, when it is determined that the steering angle information of the steering wheel supplied from the at least one first steering angle sensor 510 to the first steering control module 110 is abnormal based on the result of the monitoring, the second steering control module 120 can change the initiative for controlling the steering motor 600 from the first steering module 110 to the second steering control module 120.

That is, when it is determined that the steering angle information of the steering wheel supplied from the at least one first steering angle sensor 510 to the first steering control module 110 is abnormal based on the result of the monitoring, the second steering control module 120 can control the steering motor 600 instead of the first steering control module 110 based on steering angle information of the steering wheel received from the at least one second steering angle sensor 520.

In another embodiment, when it is determined that the steering angle information of the steering wheel supplied from the at least one first steering angle sensor 510 to the first steering control module 110 is normal based on the result of the monitoring, the second steering control module 120 can operate such that the first steering module 110 continuously retains the initiative for controlling the steering motor 600.

That is, when it is determined that the steering angle information of the steering wheel supplied from the at least one first steering angle sensor 510 to the first steering control module 110 is normal based on the result of the monitoring, the steering motor 600 can be allowed to be continuously controlled by the first steering module 110.

Referring to FIG. 1, the steering apparatus 1000 of the vehicle according to aspects of the present disclosure may include the steering motor 600.

The steering motor 600 may be connected to each of the steering control modules 110 and 120. The operation of the steering motor sensor module 600 can be controlled by each of the steering control modules 110 and 120. The operation of the steering motor 600 can be controlled by the first steering control module 110. When an operating status of the first steering control module 110 is abnormal, the operation of the steering motor 600 can be controlled by the second steering control module 120 instead of the first steering control module 110.

The steering motor 600 may include a single winding type motor, but embodiments of the present disclosure are not limited thereto. For example, any types of motors may be included in the steering motor 600 as long as they can be controlled by each of the steering control modules.

Referring to FIG. 1, the steering apparatus 1000 of the vehicle according to aspects of the present disclosure may include an external communication network 700.

The external communication network 700 may include a plurality of external communication networks. For example, the external communication network 700 may include a first external communication network 710 and a second external communication network 720.

The first external communication network 710 can connect between the first steering control module 110 and the vehicle 2000. The first external communication network 710 can supply status information of the vehicle supplied from the vehicle 2000 to the first steering control module 110. The first external communication network 710 may be referred to as a primary external communication network as it can supply the status information of the vehicle supplied from the vehicle 2000 to the first steering control module 110.

The second external communication network 720 can connect between the second steering control module 120 and the vehicle 2000. The second external communication network 720 can supply status information of the vehicle supplied from the vehicle 2000 to the second steering control module 120. The second external communication network 720 may be referred to as a sub external communication network or a redundant external communication network as it can supply the status information of the vehicle supplied from the vehicle 2000 to the second steering control module 120.

The external communication network 700 may include at least one of a wired communication network and a wireless communication network. In particular, the external communication network 700 may include a control area network (CAN), but embodiments of the present disclosure are not limited thereto. For example, any types of communication networks may be included in the external communication network 200 as long as they can connect between each of the steering control modules and the vehicle 2000.

The operation of the external communication network 700 can be controlled and monitored by each of the steering control modules 110 and 120. Each of the steering control modules 110, 120 can monitor an operating status of the external communication network 700 and status information of the vehicle supplied from the vehicle 2000 via the external communication network 700, and determine an initiative for controlling the steering motor 600 based on a result of the monitoring.

For example, the second steering control module 120 can monitor an operating status of the first steering control module 110 via the internal communication network 200. Further, the second steering control module 120 can determine the initiative for controlling the steering motor 600 based on the result of the monitoring. The second steering control module 120 can monitor an operating status of the first external communication network 710 and status information of the vehicle supplied from the vehicle 2000 via the first external communication network 710 by monitoring the operating status of the first steering control module 110.

In one embodiment, when it is determined that the status information of the vehicle supplied from the vehicle 2000 via the first external communication network 710 is abnormal based on the result of the monitoring, the second steering control module 120 can change the initiative for controlling the steering motor 600 from the first steering module 110 to the second steering control module 120.

That is, when it is determined that the status information of the vehicle supplied from the vehicle 2000 via the first external communication network 710 is abnormal based on the result of the monitoring, the second steering control module 120 can control the steering motor 600 instead of the first steering control module 110 based on status information of the vehicle supplied from the vehicle 2000 via the second external communication network 720.

In another embodiment, when it is determined that the status information of the vehicle supplied from the vehicle 2000 via the first external communication network 710 is normal based on the result of the monitoring, the second steering control module 120 can operate such that the first steering module 110 continuously retains the initiative for controlling the steering motor 600.

That is, when it is determined that the status information of the vehicle supplied from the vehicle 2000 via the first external communication network 710 is normal based on the result of the monitoring, the second steering control module 120 can operate such that the first steering module 110 continuously retains the initiative for controlling the steering motor 600.

The status information of the vehicle may include at least one of speed information of the vehicle, torque information of the vehicle, steering angle information of the vehicle, yaw angle information of the vehicle, pedal information of the vehicle, and engine power information of the vehicle, which can represent statuses of the vehicle; however, embodiments of the present disclosure are not limited thereto. For example, any type of information may be included in the status information of the vehicle as long as it can represent a status of the vehicle.

The status information of the vehicle may include at least one of ambient illuminance information of the vehicle, surrounding rainfall information of the vehicle, and surrounding snow information of the vehicle, which can represent internal and/or external surrounding environments of the vehicle, but embodiments of the present disclosure are not limited thereto. For example, any type of information may be included in the status information of the vehicle as long as it can represent internal and/or external surrounding environment(s) of the vehicle.

Figure 2:
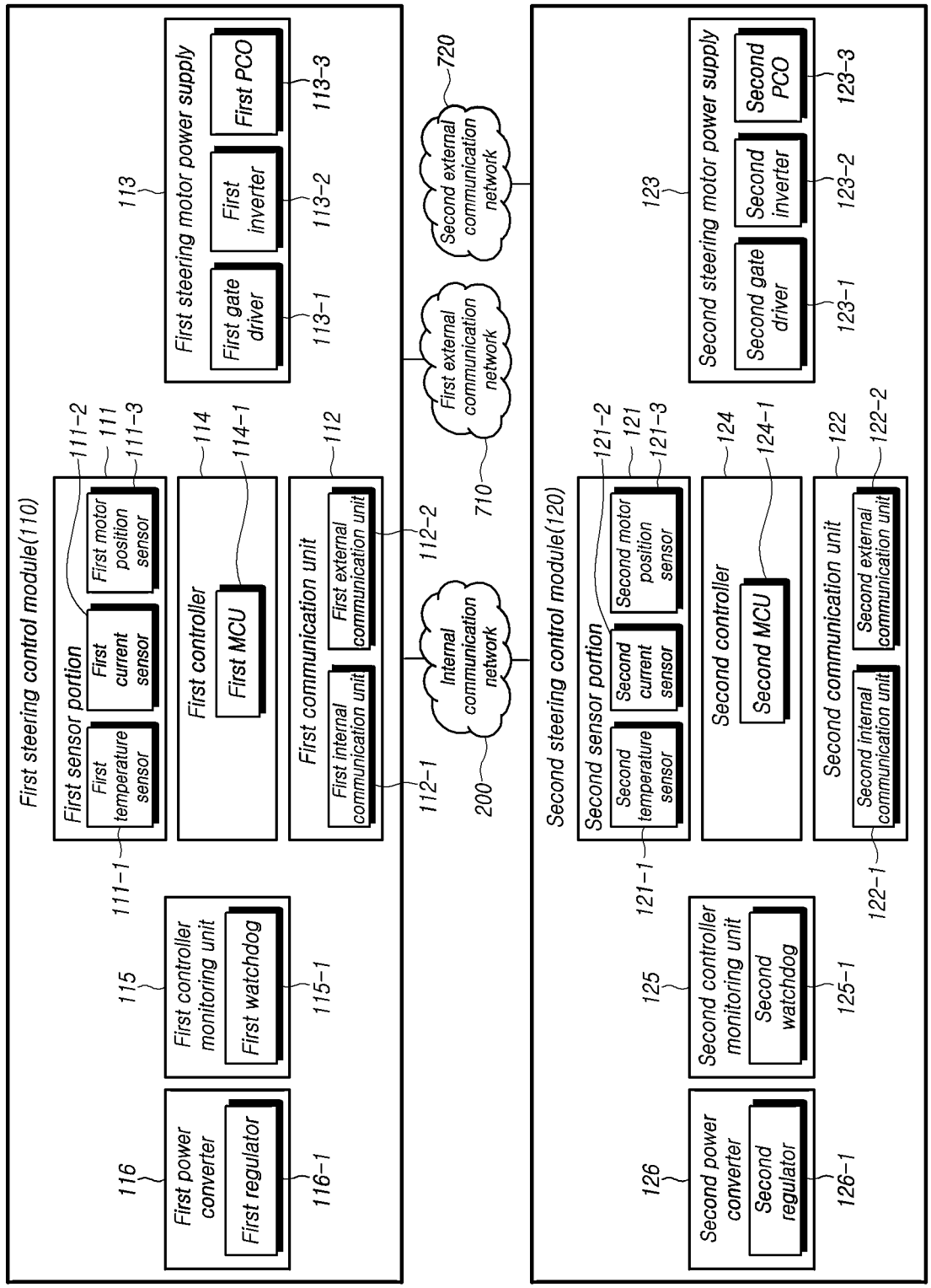
FIG. 2 illustrates an example steering control apparatus of the vehicle according to aspects of the present disclosure.

FIG. 2 is a detailed diagram of the steering control apparatus of the vehicle according to aspects of the present disclosure.

Referring back to FIG. 2, the steering control apparatus 100 may include the first steering control module 110 and the second steering control module 120 as illustrated in FIG. 1. The first steering control module 110 can include a first sensor portion 111, a first communication device 112, a first steering motor power supply 113, a first controller 114, and a first controller monitoring unit 115, a first power converter 116, and the like.

The second steering control module 120 can include a second sensor portion 121, a second communication device 122, a second steering motor power supply 123, a second controller 124, and a second controller monitoring unit 125, a second power converter 126, and the like.

Since the first sensor portion 111, the first communication device 112, the first steering motor power supply 113, the first controller 114, the first controller monitoring unit 115, and the first power converter 116 of the first steering control module 110 may be equal, or substantially equal, to the second sensor portion 121, the second communication device 122, the second steering motor power supply 123, the second controller 124. the second controller monitoring unit 125, and the second power converter 126 of the second steering control module 120, respectively, hereinafter, for simplicity of description, discussions will be conducted on only the elements of the first steering control module 110.

The first sensor portion 111 may include a first temperature sensor 111-1, a first current sensor 111-2, and a first motor position sensor 111-3, but embodiments of the present disclosure are limited thereto. For example, any types of sensors may be included in the first sensor 111 as long as they can measure a status of the steering apparatus of the vehicle.

The first temperature sensor 111-1 can measure a temperature of the first steering control module 110. The first temperature sensor 111-1 can acquire first temperature information based on the measured temperature for the first steering control module 110. The first temperature sensor 111-1 may be connected to the first controller 114. The first temperature sensor can supply the acquired first temperature information to the first controller 114.

The first current sensor 111-2 can measure a first assist current between the first steering motor power supply 113 and the steering motor 600. The first current sensor 111-2 can acquire first assist current information based on the measured first assist current. The first current sensor 111-2 may be connected to the first controller 114. The first current sensor 111-2 can supply the acquired first assist current information to the first controller 114.

The first motor position sensor 111-3 can measure a position of the steering motor 600. The first motor position sensor 111-3 can acquire first motor position information based on the measured position for the steering motor 600. The first motor position sensor 111-3 may be connected to the first controller 114. The first motor position sensor 111-3 can supply the acquired first motor position information to the first controller 114.

The first communication device 112 may include a first internal communication device 112-1, a first external communication device 112-2, and the like.

The first internal communication device 112-1 may be connected to a second internal communication device 122-1 of the second steering control module 120 via the internal communication network 200. That is, the first internal communication device 112-1 and the second internal communication device 122-1 can be connected to each other via the internal communication network 200, and can transmit and receive information on the first steering control module 110 and the second steering control module 120 to and from each other.

The first internal communication device 112-1 may be connected to the first controller 114. That is, the first internal communication device 112-1 can supply information (e.g., operating status information etc. of the second steering control module 120) received from the second steering control module 120 via the internal communication network 200 to the first controller 114. Further, the first internal communication device 112-1 can supply information (e.g., operating status information etc. of the first steering control module 110) received from the first controller 114 to the second internal communication device 122-1 via the internal communication network 200.

The first external communication device 112-2 may be connected to the vehicle 2000 via the first external communication network 710. That is, the first external communication device 112-2 and the vehicle 2000 may be connected to each other via the first external communication network 710, and therefore, can transmit and receive information on the first steering control module 110 and the vehicle to and from each other. For example, the first external communication device 112-2 can supply information (e.g., vehicle status information, etc.) received from the vehicle 2000 via the first external communication network 710 to the first controller 114. Further, the first external communication device 112-2 can supply information (e.g., operating status information etc. of the first steering control module 110) received from the first controller 114 to the vehicle 2000 via the first external communication network 710.

The first internal communication device 112-1 and the second external communication device 112-2 may include at least one of wired and wireless communication terminals. In particular, the first internal communication device 112-1 and the second external communication device 112-2 may include CAN-based communication terminals; however, embodiments of the present disclosure are not limited thereto. For example, any types of communication terminals may be included in the first internal communication device 112-1 and the second external communication device 112-2 as long as they can enable each of the steering control modules and the vehicle to be connected to each other.

The first steering motor power supply 113 may include a first gate driver 113-1, a first inverter 113-2, a first phase disconnector (or phase cut off circuit) ("PCO") 113-3, and the like.

The first gate driver 113-1 may be connected to the first controller 114. The first gate driver 113-1 can receive a first gate signal from the first controller 114. The first gate driver 113-1 may be connected to the first inverter 113-2. The first gate driver 113-1 can supply the first gate signal received from the first controller 114 to the first inverter 113-2.

The first inverter 113-2 may be connected to the voltage supply module 300. The first DC voltage from the voltage supply module 300 can be supplied to the first inverter 113-2. The first inverter 113-2 may be connected to the first gate driver 113-1. The first inverter 113-2 can receive the first gate signal from the first gate driver 113-1.

The first inverter 113-2 is a DC-AC converter, and can generate a first assist current through voltage-to-current conversion for the first DC voltage transmitted from the voltage supply module 300 according to the first gate signal received from the first gate driver 113-1.

The first inverter 113-2 may include a three-phase inverter, however, embodiments of the present disclosure are not limited thereto. Other types of inverters can be employed according to a type of steering motor and a power source.

The first PCO 113-3 may be connected to the first inverter 113-2. The first assist current from the first inverter 113-2 can be supplied to the first PCO 113-3.

The first PCO 113-3 can cause the first assist current supplied from the first inverter 113-2 to flow or not to flow through on-off operations. The first PCO 113-3 may be connected to the steering motor 600. The first PCO 113-3 can cause the first assist current supplied from the first inverter 113-2 to be supplied or not to be supplied to the steering motor 600.

The PCO is an element or circuit capable of cutting off a phase, and may include at least one of a switch, a circuit breaker, a disconnector, and an on-off controller; however, embodiments of the present disclosure are not limited thereto. For example, any types of components or circuits may be included in the PCO as long as they can cut off a phase.

As described above, in the steering apparatus of the vehicle according to aspects of the present disclosure, by allowing one steering motor to be shared through each PCO, each inverter can be separated from each other through each PCO, thereby, it is possible to enhance the redundancy and reliability of the vehicle.

The first controller 114 can be connected to the first sensor portion 111, the first communication device 112, the first steering motor power supply 113, the first controller monitoring unit 115, and the first power converter 116. The first controller 114 can control operations of the first sensor portion 111, the first communication device 112, the first steering motor power supply 113, the first controller monitoring unit 115, and the first power converter 116.

For example, the first controller 114 can generate a first gate signal based on torque information of the steering wheel received from the at least one first steering torque sensor 410, steering angle information of the steering wheel received from the at least one first steering angle sensor 510, first temperature information, first assist current information, and first motor position information received from the first sensor portion 111, and status information of the vehicle (e.g., speed information of the vehicle) received from the first communication device 112, and control the first assist current of the first inverter 113-2 by supplying the generated first gate signal to the first gate driver 113-1.

The first gate signal can be generated based on a preset modulation method. In particular, the preset modulation method may include at least one of pulse width modulation, optimal voltage modulation, triangular comparison voltage modulation, and space vector voltage modulation; however, embodiments of the present disclosure are not limited thereto. For example, any types of voltage modulation methods may be included in the preset modulation method as long as they can generate a gate signal for controlling the operation of the inverter.

The first controller 114 may include a first micro controller unit (MCU) 114-1; however, embodiments of the present disclosure are not limited thereto. For example, any types of devices (or computers) may be included in the first controller 114 as long as they can process (or execute and calculate) programs.

The first controller monitoring unit 115 may be connected to the first controller 114. The first controller monitoring unit 115 can monitor an operating status of the first controller 114. For example, the first controller 114 can supply a first watchdog signal to the first controller monitoring unit 115. The first controller monitoring unit 115 can be cleared or generate a first reset signal based on the first watchdog signal received from the first controller 114.

The clearing of the first controller monitoring unit 115 may mean that the first controller 114 is operating normally. The generating of the first reset signal and the supplying of the generated first reset signal to the first controller 114, by the first controller, may mean that the first controller 114 is operating abnormally, and can be reset by the first reset signal.

The first watchdog signal may be a signal (e.g., a signal preventing the resetting of the first controller 114) used for allowing the first controller monitoring unit 115 to periodically monitor the operation of the first controller 114. That is, the first watchdog signal may be a signal for indicating that a program currently being executed in the first controller 114 is alive.

The first controller monitoring unit 115 may include a first watchdog 115-1; however, embodiments of the present disclosure are not limited thereto. For example, any types of devices or circuits may be included in the first controller monitoring unit 115 as long as they can monitor an operation of the first controller 114. In particular, the first watchdog 115-1 may include a first window watchdog having a deadline, that is, a start and an end.

The first power converter 116 may be connected to the power supply module 300. The first DC voltage from the power supply module 300 can be supplied to the first power converter 116. The first power converter 116 can generate at least one first operation voltage by converting the first DC voltage supplied from the power supply module 300 to another level of voltage.

The first power converter 116 can be connected to the first sensor portion 111, the first communication device 112, the first steering motor power supply 113, the first controller 114, and the first controller monitoring unit 115. The first power converter 116 can supply the generated at least one first operation voltage to the first sensor portion 111, the first communication device 112, the first steering motor power supply 113, the first controller 114, and the first controller monitoring unit 115.

The at least one first operation voltage may be one or more voltages for operating the first sensor portion 111, the first communication device 112, the first steering motor power supply 113, the first controller 114, and the first controller monitoring unit 115. Thus, the at least one first operation voltage may be two or more first operation voltages, which may be generated by being modified from one or more of the at least one first operation voltage according to operation voltages of the first sensor portion 111, the first communication device 112, the first steering motor power supply 113, the first controller 114, and the first controller monitoring unit 115.

The first power converter 116 may include a DC-DC converter. The DC-DC converter may include a buck converter; however, embodiments of the present disclosure are not limited thereto. For example, any types of converters may be included in the DC-DC converter as long as they can convert the supplied first DC voltage to the at least one first operation voltage having a level lower than the supplied first DC voltage.

The first power converter 116 may include a first regulator 116-1. The first regulator 116-1 can convert the supplied first DC voltage to the at least one first operation voltage having a level lower than the supplied first DC voltage.

The second steering control module 120 can monitor an operating status of the first steering control module 110 currently controlling the steering motor via the internal communication network 200, and based on a result of the monitoring, when it is determined that the operating status of the first steering control module 110 is abnormal, control the steering motor 600 by using at least one of the second sensor portion 121, the second communication device 122, the second steering motor power supply 123, the second controller 124, the second controller monitoring unit 125, and the second power converter 126.

For example, the second steering control module 120 can monitor an operating status of the first steering control module 110 currently controlling the steering motor via the internal communication network 200, and based on a result of the monitoring, when it is determined that the operating status of the first steering control module 110 is abnormal, that is, if at least one of at least one of the first motor position information, the first temperature information, and the first assist current information from the first sensor portion 111, the status information of the vehicle from the first communication device 112, the first assist current from the first steering motor power supply 113, the first gate signal from the first controller 114, the first watchdog signal from the first controller monitoring unit 115, and the first operation voltage from the first power converter 116 is abnormal, can control the steering motor 600 by using at least one of the second sensor portion 121, the second communication device 122, the second steering motor power supply 123, the second controller 124, the second controller monitoring unit 125, and the second power converter 126, which perform equal function to the first sensor portion 111, the first communication device 112, the first steering motor power supply 113, the first controller 114, the first controller monitoring unit 115, and the first power converter 116, respectively, that is, by using at least one of at least one of second motor position information, second temperature information, and second assist current information from the second sensor portion 121, status information of the vehicle from the second communication device 122, a second assist current from the second steering motor power supply 123, a second gate signal from the second controller 124, a second watchdog signal from the second controller monitoring unit 125, and a second operation voltage from the second power converter 126.

Figure 3:
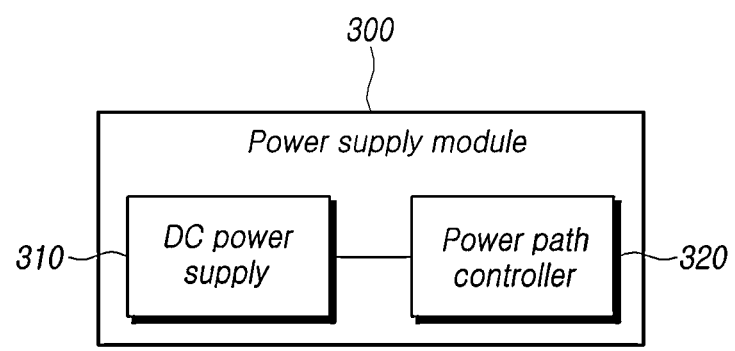
FIG. 3 illustrates an overall configuration of a power supply module of the vehicle according to aspects of the present disclosure.

FIG. 3 illustrates an overall configuration of the power supply module of the vehicle according to aspects of the present disclosure.

Referring to FIG. 3, the power supply module 300 of the vehicle according to aspects of the present disclosure may include a DC power supply 310, a power path controller 320, and the like.

The DC power supply 310 can supply a DC voltage. The DC voltage may include a first DC voltage and a second DC voltage. In particular, the first DC voltage and the second DC voltage may have an equal level of DC voltage.

The DC power supply 310 can supply the first DC voltage to the first steering control module 110. In particular, the first DC voltage may be supplied to the first regulator 116-1 of the first power converter 116 and the first inverter 113-2 of the first steering motor power supply 113.

The DC power supply 310 can supply the second DC voltage to the second steering control module 120. In particular, the second DC voltage may be supplied to a second regulator 126-1 of the second power converter 126 and a second inverter 123-2 of the second steering motor power supply 123.

In some embodiments, the power supply module 300 may further include the power path controller 320. The power path controller 320 may be connected to the DC power supply 310. A DC voltage from the DC power supply 310 can be supplied to the power path controller 320. In particular, the first DC voltage and the second DC voltage from the DC power supply 310 can be supplied to the power path controller 320.

The power path controller 320 can control a power path based on the first DC voltage and the second DC voltage supplied from the DC power supply 310, and then, supply the first DC voltage to the first steering control module 110 (i.e. the first regulator 116-1 of the first power converter 116 and the first inverter 113-2 of the first steering motor power supply 113), and supply the second DC voltage to the second steering control module 120 (i.e. the second regulator 126-1 of the second power converter 126 and the second inverter 123-2 of the second steering motor power supply 123).

Meanwhile, the second steering control module 120 can monitor an operating status of the first steering control module 110 currently controlling the steering motor through the internal communication network 200, and based on a result of the monitoring, when it is determined that the first DC voltage supplied by the DC power supply 310 (or the power path controller 320) to the first steering control module 110 is abnormal, control the steering motor 600 based on the second DC voltage supplied from the DC power supply 310 (or the power path controller 320).

Figure 4:
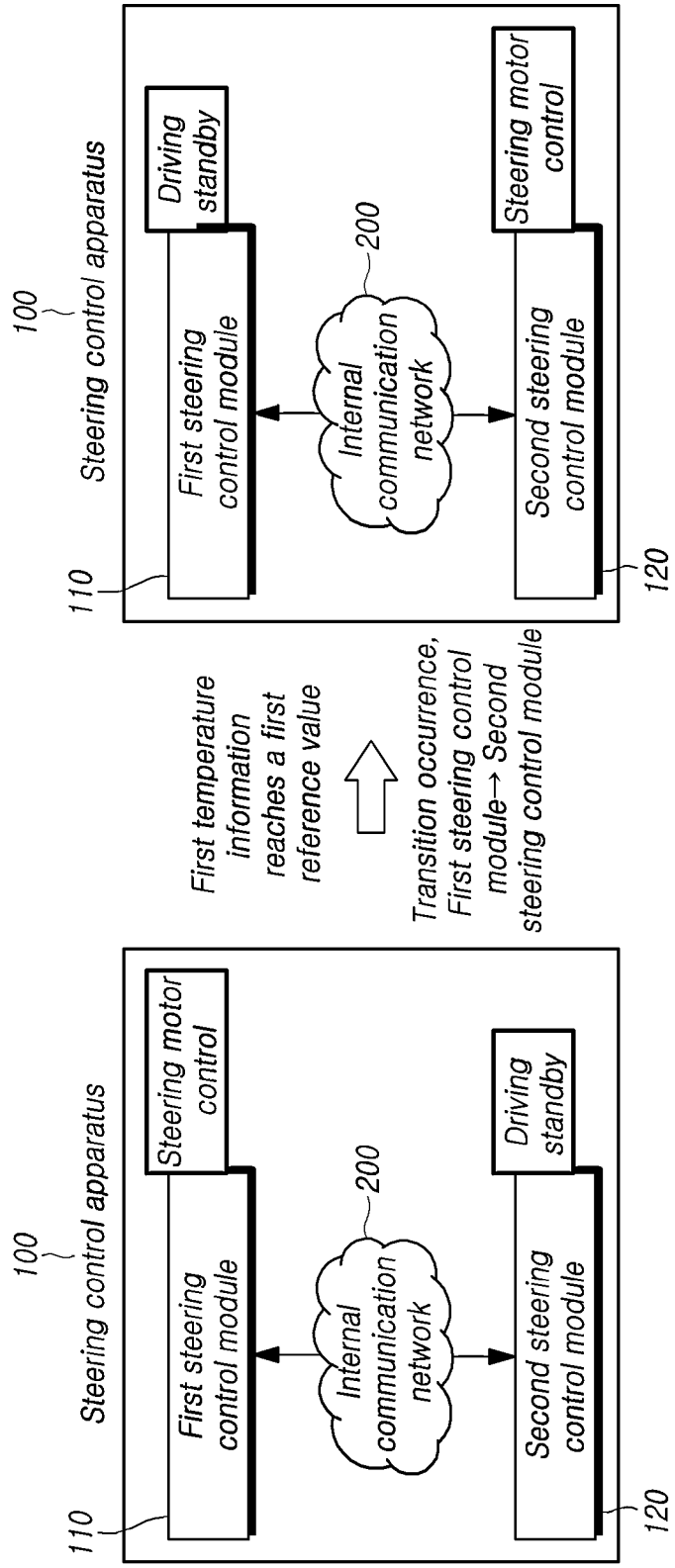
FIG. 4 illustrates that a steering motor is controlled by any of a first steering control module and a second steering control module that transition according to temperatures in the vehicle according to aspects of the present disclosure.

FIG. 4 illustrates that the steering motor is controlled by any of the first steering control module and the second steering control module that transition according to temperatures in the vehicle according to aspects of the present disclosure.

The steering control apparatus 100 may include the first steering control module 110 and the second steering control module 120 for controlling the steering motor 600. The first steering control module 110 and the second steering control module 120 may include a first temperature sensor 111-1 and a second temperature sensor 121-1 for sensing internal temperatures of the first steering control module 110 and the second steering control module 120, respectively. The first steering control module 110 can transmit information on a first temperature detected by the first temperature sensor 111-1 to the second steering control module 120, and the second steering control module 120 can receive the first temperature information and transmit information on a second temperature detected by the second temperature sensor 121-1 to the first steering control module 110.

In other words, the first temperature sensor 111-1 can detect a temperature inside the first steering control module 110 and transmit the first temperature information, which is information on this detected temperature, to the first steering control module 110. The second temperature sensor 121-1 can detect a temperature inside the second steering control module 120 and transmit the second temperature information, which is information on this detected temperature, to the second steering control module 120. The received first temperature information and second temperature information can be shared while the first steering control module 110 and the second steering control module 120 transmit and receive data. Such data transmission and reception may be performed via the internal communication network 200.

Any one of the first steering control module 110 and the second steering control module 120 can control the steering motor 600 as the first steering control module 110 and the second steering control module 120 transition based on the first temperature information and the second temperature information. Specifically, the first and second steering control modules 110 and 120 are configured in a system for providing redundancy in which respective states between the first and second steering control modules 110 and 120 can be switched for allowing respective roles between the first and second steering control modules 110 and 120 to be switched, if needed, as in a situation where a problem is predicted in maintaining the performance of the steering apparatus and preventing damage to the steering apparatus according to internal temperatures of the first and second steering control modules 110 and 120. More specifically, when the first temperature information reaches a first reference value, which is a predetermined temperature, the first steering control module 110 can be controlled to transition to a driving standby state. In this case, the second steering control module 120 in the driving standby state can transition to a normal driving state for controlling the steering motor 600. The driving standby state and the normal driving state may be defined as a slave mode (or slave state) and a master mode (or master state), respectively. This transition process may be substantially, or nearly, equal to a process in which when any one of the first and second steering control modules 110 and 120 is operating abnormally, the other in the driving standby state transitions.

Figure 5:
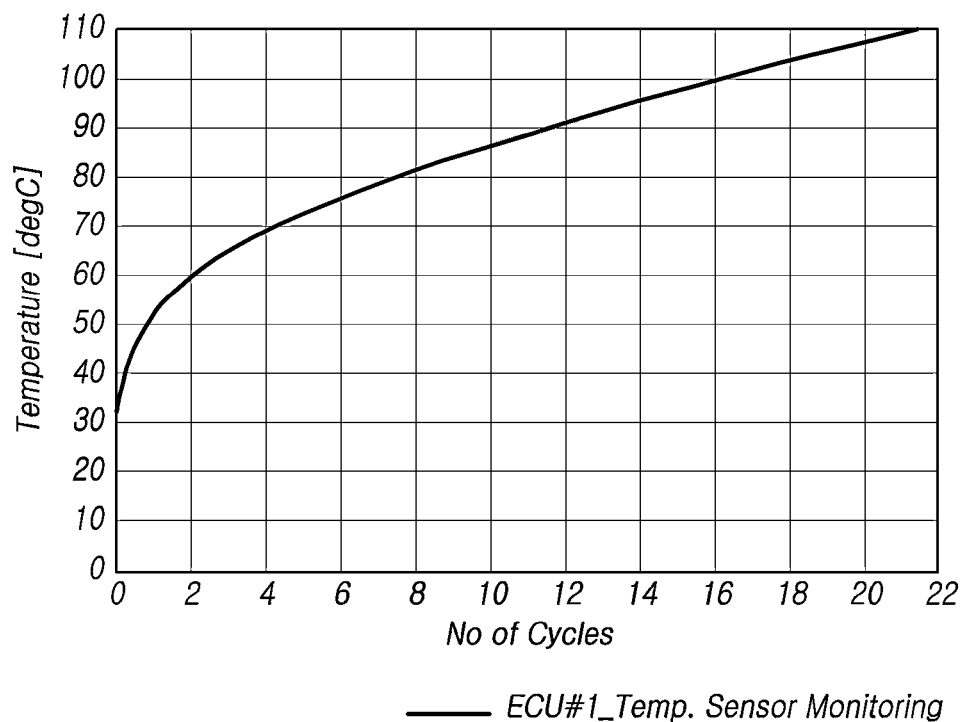
FIG. 5 illustrates an internal temperature in a situation where a steering motor is controlled by any one of the first steering control module and the second steering control module in the vehicle according to aspects of the present disclosure.
Figure 6:
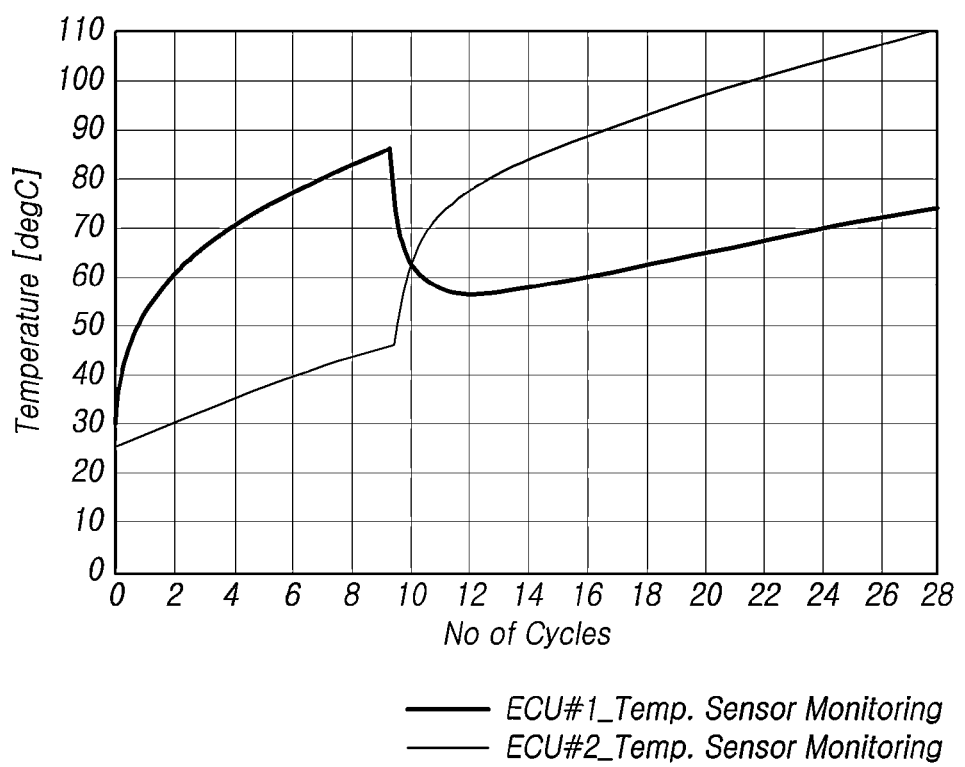
FIG. 6 illustrates respective internal temperatures in a situation where the control of the steering motor is switched as the first and second steering control modules transition according to their internal temperatures in the vehicle according to aspects of the present disclosure.

FIG. 5 illustrates an internal temperature in a situation where the steering motor 600 is controlled by any one of the first steering control module 110 and the second steering control module 120 in the vehicle according to aspects of the present disclosure. FIG. 6 illustrates respective internal temperatures in a situation where the control of the steering motor 600 is switched as the first and second steering control modules 110 and 120 transition according to their internal temperatures in the vehicle according to aspects of the present disclosure.

Referring to FIG. 5, it can be seen that an internal temperature in one of the first and second steering control modules 110 and 120 increases according to the control of a steering wheel. If the steering motor 600 is controlled using only the one steering control module, it can be seen that the steering motor 600 can operate up to about 21 turns. Here, one turn may mean moving from a clockwise limit value of the steering wheel to a counterclockwise limit value. This movement may be defined as a lock-to-lock round trip.

If any one of the first and second steering control modules 110 and 120 continuously control the steering motor 600, as current is allowed to continuously flow through the steering motor 600, therefore, the temperature inside the one steering control module may rise. In this case, a temperature of a power pack including the steering control apparatus 100 and the steering motor 600 may reach a limit temperature, and this may cause damage or poor performance. To prevent this, before reaching the limit temperature of the power pack, an overheat protection logic can be applied, and thereby, the associated steering wheel becomes heavy, so that the driver can detect an abnormality.

Therefore, if the internal temperature of the steering control module continuously rise, the performance of the steering apparatus may be deteriorated and even damage may be caused.

Referring to FIG. 6, in order to reduce the temperature rising as described above, when a temperature inside of any one currently controlling the steering motor 600 among the first steering control module 110 and the second steering control module 120 capable of controlling the steering motor 600 rises and reaches a first reference value, the one steering control module currently controlling the steering motor 600 can be controlled to transition from the normal driving state to the driving standby state, and the other steering control module can control the steering motor 600. For example, when the first temperature information is equal to or greater than the first reference value while the first steering control module 110 controls the steering motor 600, the second steering control module 120 can transition to the normal driving state, and control the steering motor 600. In turn, when the second temperature information is equal to or greater than the first reference value while the second steering control module 120 controls the steering motor 600, the first steering control module 110 can transition to the normal driving state, and control the steering motor 600. If the first steering control module 110 or the second steering control module 120 transitions to the normal driving state and controls the steering motor 600, such operation may be performed up to about 28 turns.

As described above, in the steering control apparatus 100 of the vehicle according to aspects of the present disclosure, as transitions between the normal driving state and the driving standby state are available according to internal temperatures of the steering control modules, thereby, the overheating of the power pack can be prevented and the durability thereof can be improved, this leading a more increased number of controls to be performed.

In one embodiment, while the second steering control module 120 controls the steering motor 600, when the second temperature information is equal to or greater than the first reference value, and the first temperature information is equal to or greater than the first reference value, if the second temperature information is smaller than the first temperature information, the second steering control module 120 can maintain the control for the steering motor 600. Specifically, in a situation where the first steering control module 110 and the second steering control module 120 continuously control the steering motor 600 depending on the driver's wheel braking, respective internal temperatures in the first steering control module 110 and the second steering control module 120 may rise one by one, and as a result, corresponding transition processes may repeat, eventually, this leading both the first temperature information and the second temperature information to become equal to or greater than the first reference value. In this situation, the second steering control module 120 can maintain the control for the steering motor 600 rather than allowing the control for the steering motor 600 to be switched to the first steering control module 110. Accordingly, the steering control apparatus 100 may reduce frequent transitions of the steering control modules that may occur as the internal temperatures rise.

Figure 7:
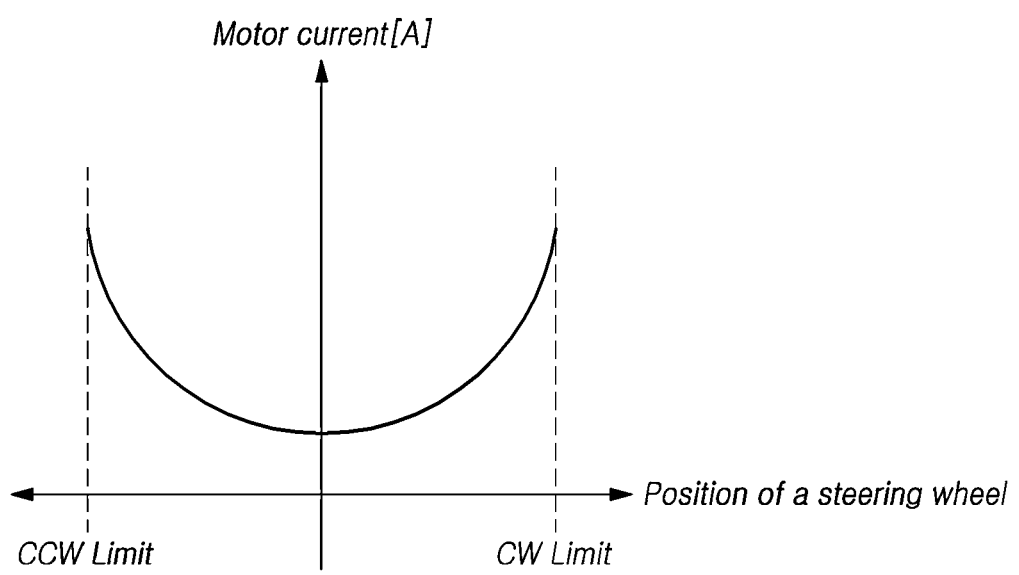
FIG. 7 illustrates that an internal temperature of a steering control module rises according to a location of a rack in the vehicle according to aspects of the present disclosure.

FIG. 7 illustrates that an internal temperature of a steering control module rises according to a location of a rack in the vehicle according to aspects of the present disclosure.

Referring to FIG. 7, an amount of current flowing through the steering motor 600 may increase according to a position of the steering wheel. Further, since the position of the rack also moves to correspond to the position of the steering wheel, basically, when the steering wheel reaches a clockwise limit (CW Limit) or a counterclockwise limit (CCW Limit), the position of the rack may also be placed at an end of a corresponding rack bar. Accordingly, since an amount of current flowing thorough the steering motor 600 increases, the internal temperature of an associated steering control module, for example, the first steering control module 110, controlling the steering motor 600 may rise rapidly.

Therefore, as the internal temperature of the first steering control module can be predicted to rapidly rise, in order to prevent this situation, if the first temperature information is greater than or equal to a second reference value, and the position of the rack is remained for a predetermined time at the end of the rack bar, while the first steering control module 110 controls the steering motor 600, the second steering control module 120 can control the steering motor 600 by transitioning to the master state (or normal driving state). That is, the second steering control module 120 can control the steering motor 600 by transitioning from the slave state (or driving standby state) to the master state (or normal driving state).

In one embodiment, if the first temperature information is equal to or greater than a second reference value, and a position of the rack reciprocates from one end to the other end a predetermined number of times, while the first steering control module 110 controls the steering motor 600, the second steering control module 120 can control the steering motor 600 by transitioning to the master state. As the steering wheel repeats lock-to-lock movements, an amount of current flowing through the steering motor 600 increases, so that it can be predicted that the first temperature information rapidly rises. Accordingly, in order to control the steering motor for a longer period of time, the transition of the second control module may be performed to control the steering motor 600.

In one embodiment, the first reference value may be set differently according to a vehicle model, and may be set differently according to a situation and purpose. For example, if it is predicted that a driving lane continuously runs in a curved state requiring a lot of braking in the future, the first reference value may be changed to a lower value. In another embodiment, in the case of freight road vehicles, great strength of current is used to move the rack, and therefore, a corresponding reference value may be set to a value lower than the first reference value. Further, the second reference value may be set to a value lower than the first reference value, and if a difference between the second reference value and the first reference value is within a critical value, then, only the second reference value may be applied.

A computer system (not shown) such as the steering control apparatus 100 or the like may include at least one or more of one or more processors, memories, storage, user interface for inputting and user interface for outputting, which communicate with one another via buses. The computer system may also include a network interface to access networks. The processor may be a CPU or a semiconductor element or device capable of executing processing instructions stored in memory and/or storage. The memory and the storage may include various types of volatile/non-volatile storage media. For example, the memory may include ROM and RAM.

Hereinafter, a steering control method using the steering control apparatus 100 capable of carrying out all of the embodiments and examples described herein will be described.

Figure 8:
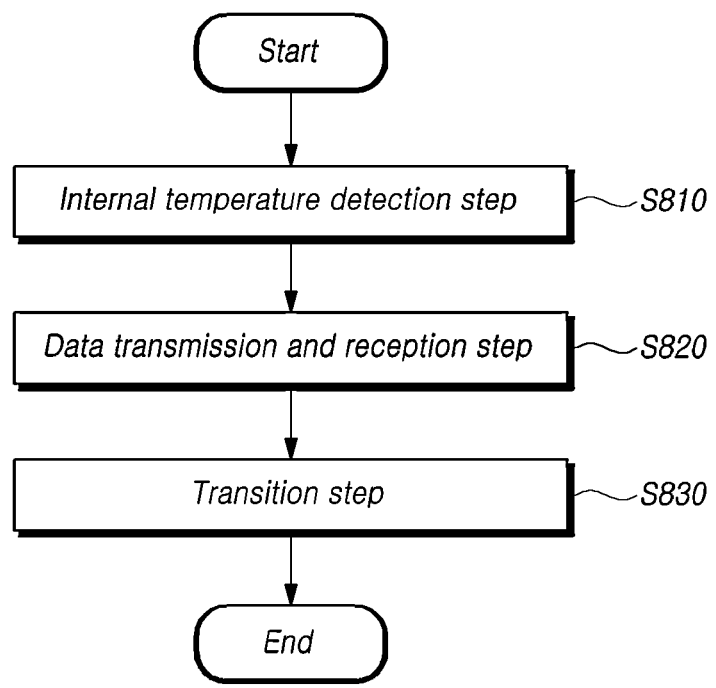
FIG. 8 is a flow chart illustrating a steering control method according to aspects of the present disclosure.

FIG. 8 is a flow chart illustrating a steering control method according to aspects of the present disclosure.

Referring to FIG. 8, the steering control method according to aspects of the present disclosure can include detecting respective internal temperatures of the first steering control module 110 and the second steering control module 120, at step S810, allowing the first steering control module 110 to transmit information on a first temperature that is the internal temperature of the first steering control module 110 to the second steering control module 120 and receive information on a second temperature that is the internal temperature of the second steering control module 120 from the second steering control module 120, and the second steering control module 120 to transmit the second temperature information to the first steering control module 110 and receive the first temperature information from the first steering control module 110, at step S820, and allowing the first or second steering control module 110 or 120 to transition to the master state according to the first and second temperature information and control a steering motor, at step S830.

In step S830, when the first temperature information is equal to or greater than a first reference value while the first steering control module 110 controls the steering motor 600, the second steering control module 120 can transition to the master state, and control the steering motor 600.

In step S830, while the second steering control module 120 controls the steering motor 600, when the second temperature information is equal to or greater than the first reference value, and the first temperature information is equal to or greater than the first reference value, if the second temperature information is smaller than the first temperature information, the second steering control module 120 can maintain the control for the steering motor 600.

In step S830, when the first temperature information is equal to or greater than a second reference value and a position of the rack reciprocates from one end to the other end a predetermined number of times, while the first steering control module 110 controls the steering motor 600, the second steering control module 120 can transition to the master state, and control the steering motor 600.

Figure 9:
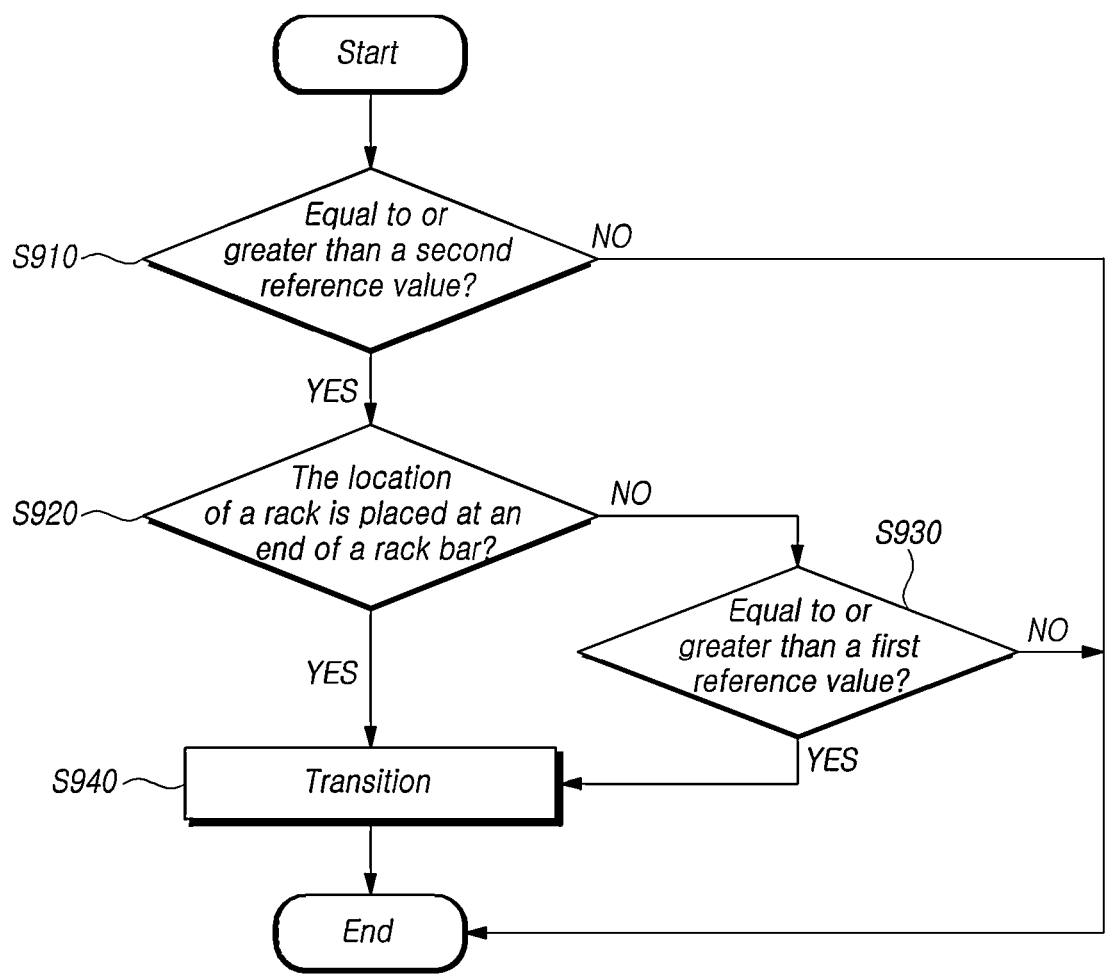
FIG. 9 is a detailed diagram for the step S830 in the steering control method according to aspects of the present disclosure.

FIG. 9 is a detailed diagram for the step S830 in the steering control method according to aspects of the present disclosure.

Referring to FIG. 9, the second steering control module 120 can determine whether the first temperature information is equal to or greater than the second reference value while the first steering control module 110 is controlling the steering motor 600, at step S910. The second steering control module 120 can receive the first temperature information including the internal temperature of the first steering control module 110 from the first steering control module 110. Based on this, the second steering control module 120 can determine whether the first temperature information is equal to or greater than the preset second reference value.

If the first temperature information is equal to or greater than the second reference value (Yes in S910), the second steering control module 120 can determine whether a position of the rack is remained at an end of the rack bar for a predetermined time, at step S920. The second steering control module 120 can receive information on a position of the rack from a rack position sensor (not shown) that detects the position of the rack.

If the position of the rack is not remained at the end of the rack bar for a predetermined time (No in S920), the second steering control module 120 can determine whether the first temperature information is equal to or greater than the first reference value, at step S930.

If the position of the rack is remained for the predetermined time at the end of the rack bar (Yes in S920), or if the first temperature information is equal to or greater than the first reference value (Yes in S930), the second steering control module 120 can transition to the master state to control the steering motor 600, at step S940.

As described above, according to the embodiments of the present disclosure, the steering control apparatus and method of allowing
the first steering control module 110 and the second steering control module 120 to transition according to their internal temperatures, and to alternately control the steering motor, therefore, it is possible to improve the stability of the power pack and the control limit for the steering motor.

In addition, according to the embodiments of the present disclosure, even when the first steering control module 110 does not malfunction, since an initiative for controlling the first steering control module 110 can transition to the second steering control module 120, thereby, the safety of the vehicle equipped with the embodiments and examples described herein can be enhanced in terms of using the first and second steering control modules 110 and 120 more efficiently.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:
1. A steering control apparatus comprising:
a first steering control module and a second steering control module capable of controlling a steering motor,
wherein the first steering control module and the second steering control module include a first temperature sensor for detecting an internal temperature of the first steering control module and a second temperature sensor for detecting an internal temperature of the second steering control module, respectively, wherein the first steering control module transmits information on a first temperature from the first temperature sensor to the second steering control module, and the second steering control module receives the information on the first temperature and transmits information on a second temperature from the second temperature sensor to the first steering control module, and wherein the first steering control module and the second steering control module transition based on the information on the first temperature and the information on the second temperature, and the first steering control module or the second steering control module controls the steering motor, wherein while the first steering control module controls the steering motor, when the first temperature information is greater than or equal to a second reference value, and a position of a rack is remained at an end of a rack bar for a predetermined time, the second steering control module transitions to a master state and controls the steering motor.

2. The steering control apparatus according to claim 1, wherein while the first steering control module controls the steering motor, when the first temperature information is greater than or equal to a first reference value, the second steering control module transitions to a master state and controls the steering motor.

3. The steering control apparatus according to claim 1, wherein while the second steering control module controls the steering motor, when the second temperature information is greater than or equal to a first reference value, and the first temperature information is greater than or equal to the first reference value, when the second temperature information is smaller than the first temperature information, the second steering control module maintains the control for the steering motor.

4. The steering control apparatus according to claim 1, wherein while the first steering control module controls the steering motor, when the first temperature information is greater than or equal to a second reference value, and a position of a rack reciprocates from one end to the other end a predetermined number of times, the second steering control module transitions to a master state and controls the steering motor.

5. A steering control method, the method comprising:
an internal temperature detection step of detecting respective internal temperatures of a first steering control module and a second steering control module;
a data transmission and reception step of allowing the first steering control module and the second steering control module to transmit and receive information on a first temperature that is an internal temperature of the first steering control module and information on a second temperature that is an internal temperature of the second steering control module to and from each other; and
a transition step of allowing the first steering control module or the second steering control module controls the steering motor by being transitioning based on the information on the first temperature and the information on the second temperature,
wherein in the transition step, while the first steering control module controls the steering motor, when the first temperature information is greater than or equal to a second reference value, and a position of a rack reciprocates from one end to the other end a predetermined number of times, the second steering control module transitions to a master state and controls the steering motor.

6. The method according to claim 5, wherein in the transition step, while the first steering control module controls the steering motor, when the first temperature information is greater than or equal to a first reference value, the second steering control module transitions to a master state and controls the steering motor.

7. The method according to claim 5, wherein in the transition step, while the second steering control module controls the steering motor, when the second temperature information is greater than or equal to a first reference value, and the first temperature information is greater than or equal to the first reference value, when the second temperature information is smaller than the first temperature information, the second steering control module maintains the control for the steering motor.

8. The method according to claim 5, wherein in the transition step, while the first steering control module controls the steering motor, when the first temperature information is greater than or equal to a second reference value, and a position of a rack is remained at an end of a rack bar for a predetermined time, the second steering control module transitions to a master state and controls the steering motor.

* * * * *